(12) United States Patent
Wroblewski

(10) Patent No.: US 11,314,667 B1
(45) Date of Patent: Apr. 26, 2022

(54) REAL-TIME PROCESSING SYSTEM SYNCHRONIZATION IN A CONTROL SYSTEM

(71) Applicant: Otis Elevator Company, Farmington, CT (US)

(72) Inventor: Marcin Wroblewski, Burlington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/128,725

(22) Filed: Dec. 21, 2020

(51) Int. Cl.
*G06F 13/28* (2006.01)
*G06F 9/48* (2006.01)
*G06F 13/16* (2006.01)
*G06F 13/24* (2006.01)
*G05B 15/02* (2006.01)

(52) U.S. Cl.
CPC ......... *G06F 13/1668* (2013.01); *G05B 15/02* (2013.01); *G06F 13/24* (2013.01); *G06F 13/28* (2013.01)

(58) Field of Classification Search
None
See application file for complete search history.

(56) References Cited

U.S. PATENT DOCUMENTS

| | | | | |
|---|---|---|---|---|
| 2008/0114937 | A1* | 5/2008 | Reid | G06F 11/362 711/117 |
| 2009/0179997 | A1* | 7/2009 | Lin | H04N 5/772 348/222.1 |
| 2012/0059605 | A1* | 3/2012 | Chimanbhai | H04B 3/46 702/57 |
| 2017/0300447 | A1* | 10/2017 | Liu | G06F 13/1657 |
| 2020/0111286 | A1* | 4/2020 | Allen | G07F 17/3216 |

* cited by examiner

*Primary Examiner* — Hyun Nam
(74) *Attorney, Agent, or Firm* — Cantor Colburn LLP (57) ABSTRACT

A system includes a memory system and a processor of a first processing system including a processor core, a direct memory access controller, and a communication interface. The processor core is configured to execute a plurality of instructions to configure the direct memory access controller to trigger a transmitter interrupt upon transmitting a first synchronization message through the communication interface to a second processing system, configure the direct memory access controller to trigger a receiver interrupt upon receiving a second synchronization message from the second processing system, determine a time difference between triggering of the transmitter interrupt and the receiver interrupt, and adjust a synchronization skew of a real-time scheduler based on the time difference to tune real-time synchronization between the first processing system and the second processing system.

20 Claims, 5 Drawing Sheets

REAL-TIME PROCESSING SYSTEM SYNCHRONIZATION IN A CONTROL SYSTEM

BACKGROUND

Exemplary embodiments pertain to the art of control systems and, more particularly, to real-time processing system synchronization in a control system.

Control systems can include multiple processing systems that make real-time decisions to control one or more effectors. The processing systems may need to be closely synchronized to make control decisions and provide redundancy in case of a system fault. Synchronization can be implemented through various techniques. A shared real-time clock is one synchronization approach that can provide close synchronization but may require dedicated signal paths and risk a single event upset to multiple systems if the shared real-time clock experiences a fault. Another approach for synchronization is an exchange of handshake and acknowledgement messages between multiple processing systems. This approach can result in busy waiting as processing systems continually poll receiver registers while waiting for a response.

BRIEF DESCRIPTION

Disclosed is a system that includes a memory system and a processor of a first processing system including a processor core, a direct memory access controller, and a communication interface. The processor core is configured to execute a plurality of instructions to configure the direct memory access controller to trigger a transmitter interrupt upon transmitting a first synchronization message through the communication interface to a second processing system, configure the direct memory access controller to trigger a receiver interrupt upon receiving a second synchronization message from the second processing system, determine a time difference between triggering of the transmitter interrupt and the receiver interrupt, and adjust a synchronization skew of a real-time scheduler based on the time difference to tune real-time synchronization between the first processing system and the second processing system.

In addition to one or more of the features described herein, or as an alternative, further embodiments may include where the direct memory access controller is configured to transfer the first synchronization message from a transmit buffer of the memory system to the communication interface absent intervention by the processor core.

In addition to one or more of the features described herein, or as an alternative, further embodiments may include where the processor core is operable to perform one or more other tasks while the direct memory access controller transfers the first synchronization message from the transmit buffer of the memory system to the communication interface.

In addition to one or more of the features described herein, or as an alternative, further embodiments may include where the direct memory access controller is configured to transfer the second synchronization message from the communication interface to a receive buffer of the memory system absent intervention by the processor core.

In addition to one or more of the features described herein, or as an alternative, further embodiments may include where the processor core is operable to perform one or more other tasks while the direct memory access controller transfers the second synchronization message from the communication interface to the receive buffer of the memory system.

In addition to one or more of the features described herein, or as an alternative, further embodiments may include where the processor core is configured to shorten an execution frame time based on determining that the time difference exceeds a synchronization threshold, and the transmitter interrupt occurred after the receiver interrupt.

In addition to one or more of the features described herein, or as an alternative, further embodiments may include where the processor core is configured to extend an execution frame time based on determining the time difference exceeds a synchronization threshold, and the receiver interrupt occurred after the transmitter interrupt.

In addition to one or more of the features described herein, or as an alternative, further embodiments may include where the communication interface includes a Universal Asynchronous Receiver/Transmitter.

In addition to one or more of the features described herein, or as an alternative, further embodiments may include where the first processing system and/or the second processing system are part of a real-time controller of a control system.

In addition to one or more of the features described herein, or as an alternative, further embodiments may include where the control system is a controller of an elevator system.

Also disclosed is a method that includes configuring a direct memory access controller to trigger a transmitter interrupt upon transmitting a first synchronization message from a first processing system through a communication interface to a second processing system. The direct memory access controller is configured to trigger a receiver interrupt upon receiving a second synchronization message at the first processing system from the second processing system. A time difference between triggering of the transmitter interrupt and the receiver interrupt is determined. A synchronization skew of a real-time scheduler is adjusted based on the time difference to tune real-time synchronization between the first processing system and the second processing system.

In addition to one or more of the features described herein, or as an alternative, further embodiments may include transferring, by the direct memory access controller, the first synchronization message from a transmit buffer of the memory system to the communication interface absent intervention by a processor core of the first processing system.

In addition to one or more of the features described herein, or as an alternative, further embodiments may include performing one or more other tasks, by the processor core, while the direct memory access controller transfers the first synchronization message from the transmit buffer of the memory system to the communication interface.

In addition to one or more of the features described herein, or as an alternative, further embodiments may include transferring, by the direct memory access controller, the second synchronization message from the communication interface to a receive buffer of the memory system absent intervention by the processor core.

In addition to one or more of the features described herein, or as an alternative, further embodiments may include performing one or more other tasks, by the processor core, while the direct memory access controller transfers the second synchronization message from the communication interface to the receive buffer of the memory system.

In addition to one or more of the features described herein, or as an alternative, further embodiments may include shortening an execution frame time based on determining that the time difference exceeds a synchronization threshold, and the transmitter interrupt occurred after the receiver interrupt.

In addition to one or more of the features described herein, or as an alternative, further embodiments may include extending an execution frame time based on determining that the time difference exceeds a synchronization threshold, and the receiver interrupt occurred after the transmitter interrupt.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
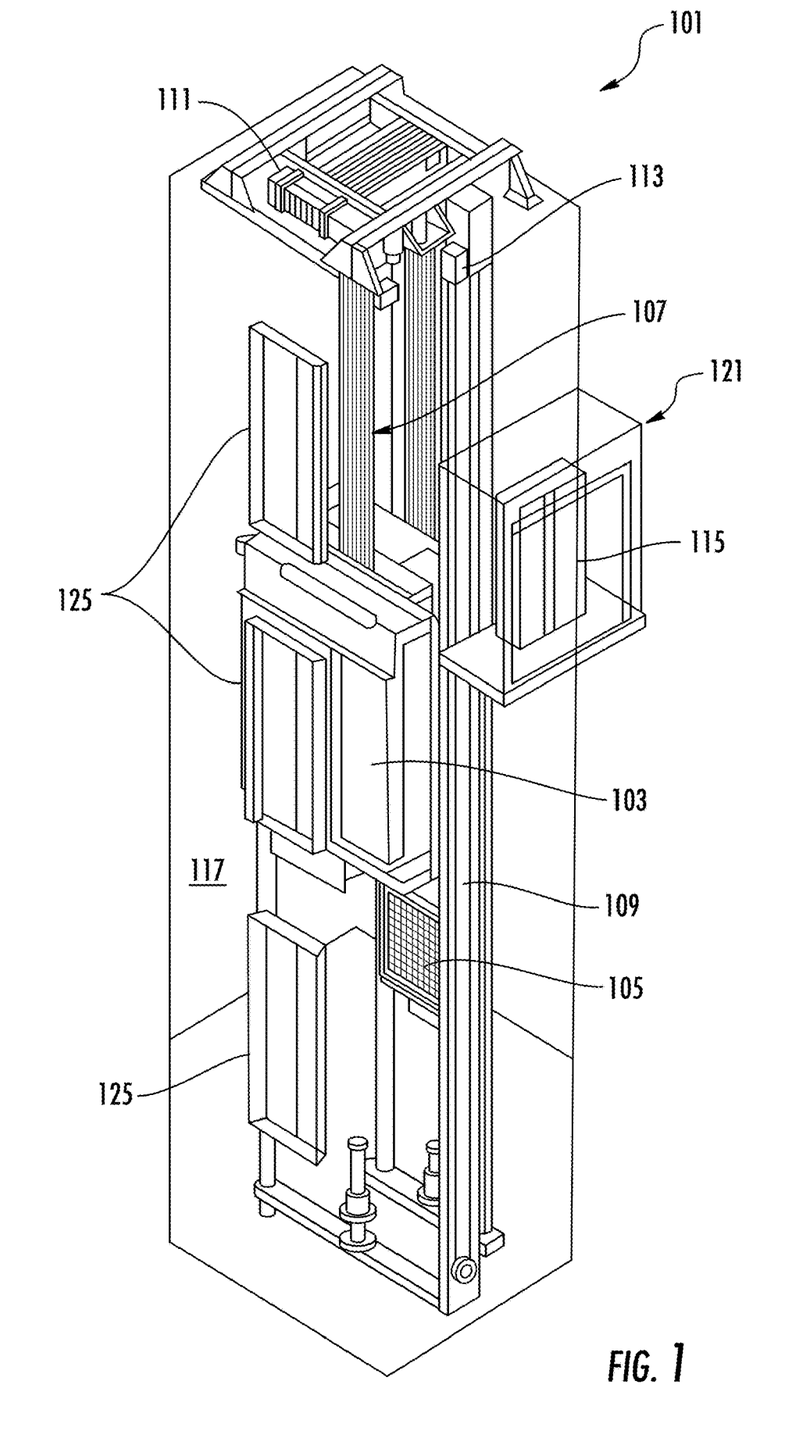
FIG. 1 is a schematic illustration of an elevator system according to an embodiment of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels or traction wheels). Other embodiments can include escalators, moving walkways, or other transportation systems. Further embodiments can include any multi-processing system configured for real-time synchronous operation. FIG. 1 is merely a non-limiting example presented for illustrative and explanatory purposes.

Figure 2:
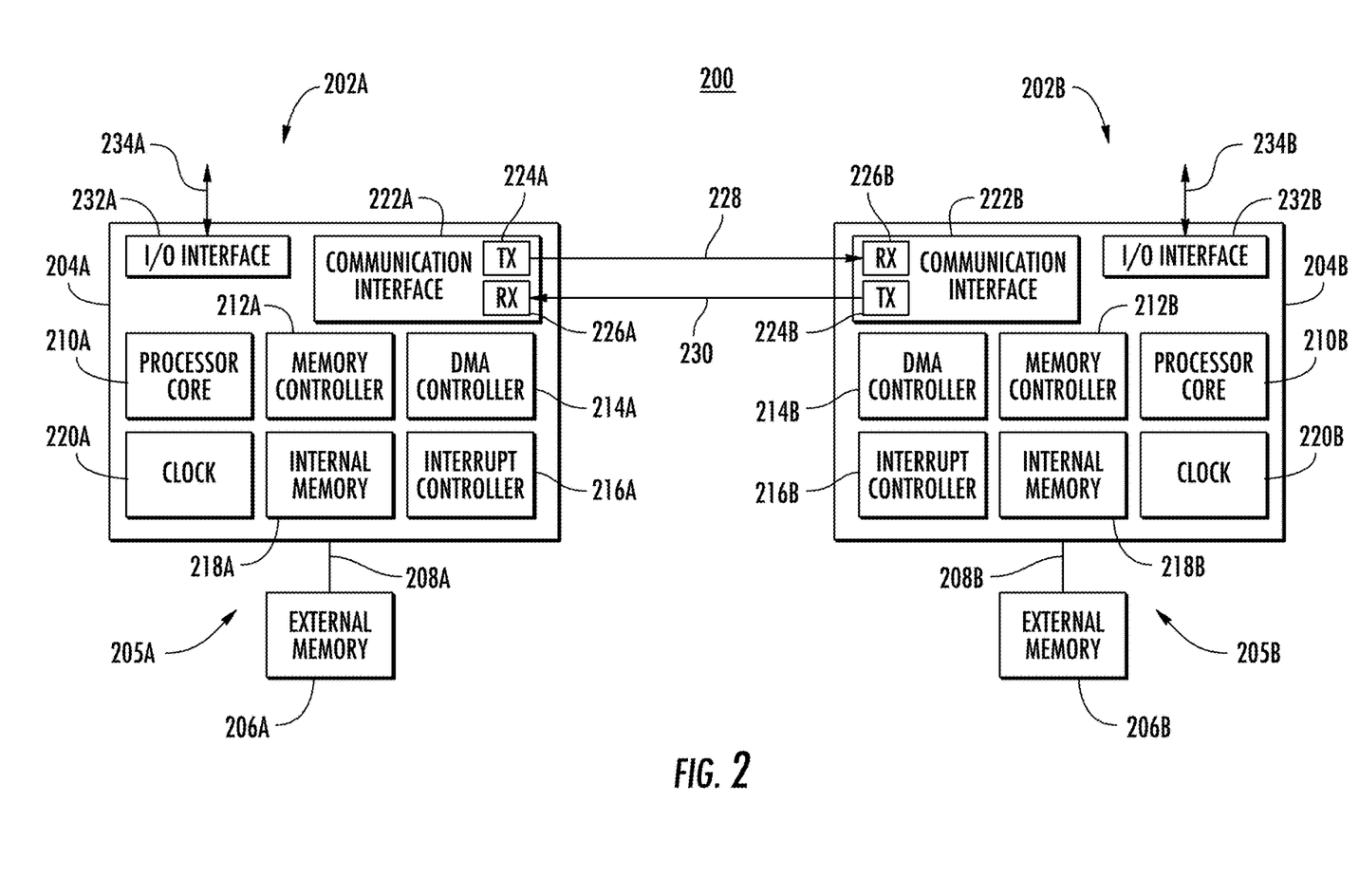
FIG. 2 depicts a system with multiple synchronized processing systems, according to an embodiment of the present disclosure.

Turning now to FIG. 2, an exemplary system 200 for synchronized real-time control in accordance with one or more embodiments is shown. The system 200 may include at least two processing systems 202A, 202B. Each of the processing systems 202A, 202B can be components of a real-time controller, such as the controller 115 of FIG. 1. For example, processing systems 202A, 202B can be redundant control channels of the controller 115 to enhance reliability of the controller 115 such that one of the processing systems 202A, 202B can take over control operations of the elevator system 101 of FIG. 1 in the event of a fault in the other. Although described with respect to the controller 115 of FIG. 1, it will be understood that the system 200 can be implemented in any type of real-time synchronized multichannel system. As used herein, the term "channel" refers to a separate instance of the processing system 202A or 202B and associated support circuitry. Further, the synchronization described herein can be extended to larger scale systems including multiple synchronized components.

The processing systems 202A, 202B can respectively include processors 204A, 204B and memory systems 205A, 205B, which can include external memory 206A, 206B coupled through memory buses 208A, 208B. The processors 204A, 204B can respectively include processor cores 210A, 210B; memory controllers 212A, 212B; direct memory access (DMA) controllers 214A, 214B; interrupt controllers 216A, 216B; internal memory 218A, 218B; clocks 220A, 220B; and communication interface 222A, 222B with transmitters 224A, 224B and receivers 226A, 226B. The memory systems 205A, 205B can also include memory controllers 212A, 212B and internal memory 218A, 218B.

The communication interfaces 222A, 222B can each include a Universal Asynchronous Receiver/Transmitter (UART) to manage incremental (e.g., bitwise) transmission of status and data between the processing systems 202A, 202B. The transmitter 224A of communication interface 222A is configured to communicate with the receiver 226B of the communication interface 222B through a first communication link 228. The transmitter 224B of communication interface 222B is configured to communicate with the receiver 226A of the communication interface 222A through a second communication link 230. The communication links 228, 230 can be unidirectional or bidirectional communication paths that support cross-channel communication between the processing systems 202A, 202B. The processors 204A, 204B can also respectively include input/output (I/O) interfaces configured to communicate with various I/O devices, such as the machine 111 of FIG. 1, through I/O links 234A, 234B. Although the machine 111 of FIG. 1 is one example, the I/O links 234A, 234B can interface with various types of I/O devices, such as sensors and effectors of real-time control systems.

The processor cores 210A, 210B include processing circuitry configurable to execute a plurality of instructions that may be stored in the external memory 206A, 206B and/or the internal memory 218A, 218B in a non-transitory form. The external memory 206A, 206B and/or the internal memory 218A, 218B can include a combination of volatile and nonvolatile memory controlled by memory controllers 212A, 212B. The DMA controllers 214A, 214B can be configured to manage the movement of data between the communication interfaces 222A, 222B and the memory systems 205A, 205B without the processor cores 210A, 210B actively writing and reading messages directly to/from the communication interfaces 222A, 222B. This frees the processor cores 210A, 210B to execute other instructions while messages are loaded by DMA controllers 214A, 214B to the communication interfaces 222A, 222B for cross-channel transmission. Similarly, as the communication interfaces 222A, 222B receive messages, the DMA controllers 214A, 214B can write the messages to the memory systems 205A, 205B without active intervention by the processor cores 210A, 210B.

The interrupt controllers 216A, 216B can be configured to trigger interrupts respectively to the processor cores 210A, 210B upon completing DMA transmit or receive sequences. For example, processor core 210A can configure the interrupt controller 216A to trigger a DMA transmit interrupt when the DMA controller 214A completes sending a message having a predetermined size to the communication interface 222A for transmission to processing system 202B. The processor core 210A can also provide the DMA controller 214A with a transmit buffer location in the external memory 206A or the internal memory 218A to be read for transfer to the communication interface 222A. After the contents of the message is loaded into the transmit buffer, the DMA controller 214A can be configured to transfer the contents to the communication interface 222A, with the interrupt controller 216A triggering an interrupt to the processor core 210A upon completing the transfer. Depending on the message size, throughput of the communication link 228 and other factors, transmission of a message can take a variable amount of time. The processor core 210A is free to perform one or more other tasks while the message is transmitted. For example, application tasks, diagnostic tasks, or other such tasks can be performed that do not directly involve the communication interface 222A while the DMA controller 214A actively transfers data to and from the communication interface 222A. A similar approach can be taken for receiving messages on communication link 230, routing the message to a receive buffer of the processing system 202A, and triggering an interrupt to the processor core 210A upon receiving and transferring a predetermined amount of message data by the DMA controller 214A. Further, a similar process can be followed by the processing system 202B. Although depicted separately, the DMA controller 214A and interrupt controller 216A can be combined. Similarly, the DMA controller 214B and interrupt controller 216B can be combined.

In embodiments, the clocks 220A, 220B may not operate at precisely the same frequency and can experience drift over a period of time. In order to maintain synchronization between the processing systems 202A, 202B, the processing systems 202A, 202B can periodically exchange synchronization messages to adjust either or both of the clocks 220A, 220B to tune real-time synchronization by extending or reducing an execution time frame of a synchronization cycle. For example, a clock drift difference may occur at a nanosecond or microsecond scale, but periodic synchronization adjustments can maintain synchronization at a millisecond scale. Depending upon capability and synchronization accuracy requirements, the synchronization operations may be performed at a predetermined interval, such as every 10 milliseconds, every 100 milliseconds, every 1,000 milliseconds, etc.

Figure 3:
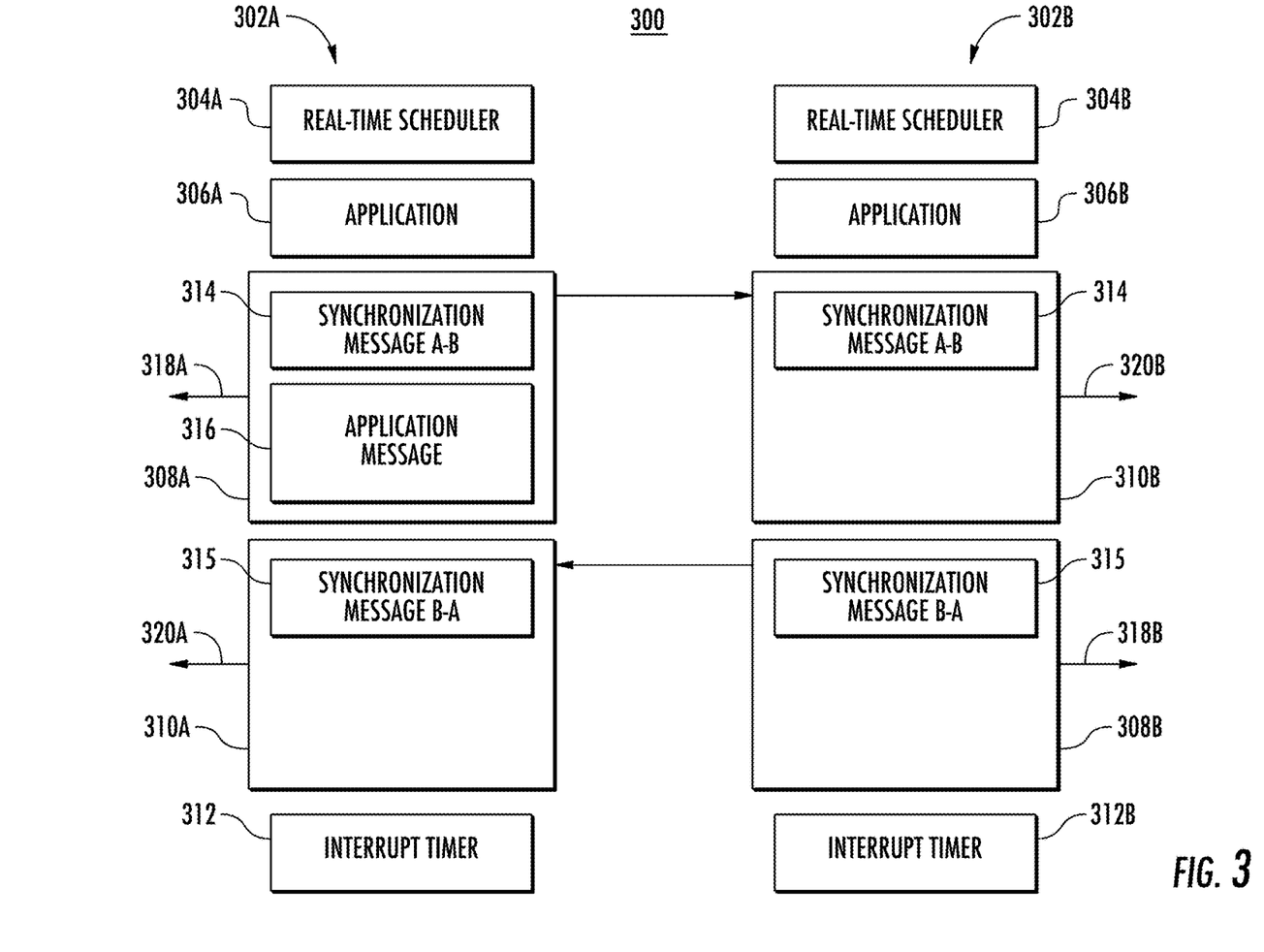
FIG. 3 depicts memory system configurations for synchronizing multiple processing systems, according to an embodiment of the present disclosure.

FIG. 3 depicts an example of a synchronization system 300 according to an embodiment. The synchronization system 300 includes a memory system configuration 302A of processing system 202A of FIG. 2 and a memory system configuration 302B of processing system 202B of FIG. 2. The memory system configurations 302A, 302B indicate example configurations of portions of the memory systems 205A, 205B of FIG. 2 to support real-time synchronization, for instance, using any combination of the external memory 206A, 206B and/or the internal memory 218A, 218B of FIG. 2. The memory system configurations 302A, 302B can respectively include real-time schedulers 304A, 304B; applications 306A, 306B; DMA transmit buffers 308A, 308B; DMA receive buffers 310A, 310B; and interrupt timers 312A, 312B. The real-time schedulers 304A, 304B can be configured to schedule task execution for low-level tasks and higher-level tasks of the applications 306A, 306B. The real-time schedulers 304A, 304B can also establish real-time synchronization between the processing systems 202A, 202B of FIG. 2 to periodically adjust a synchronization skew such that synchronization is maintained over longer-term operation. The applications 306A, 306B can be configured to perform application-level processing based on sensor data from the I/O interfaces 232A, 232B of FIG. 2 and determining one or more commands to control effectors through the I/O interfaces 232A, 232B of FIG. 2, such as controlling the machine 111 of FIG. 1.

As one example, the real-time scheduler 304A can include instructions executable by the processor core 210A of FIG. 2 to load the DMA transmit buffer 308A with a synchronization message A-B 314. The application 306A may load the DMA transmit buffer 308A with an application message 316 for the processing system 202B of FIG. 2. The DMA controller 214A of FIG. 2 can be configured to transfer the synchronization message A-B 314 from the DMA transmit buffer 308A through the communication interface 222A of FIG. 2 to the DMA receive buffer 310B. Upon completing the transfer of synchronization message A-B 314, a transmitter interrupt 318A can be triggered to the processor core 210A of FIG. 2. Upon the DMA controller 214B completing transferring the synchronization message A-B 314 from the communication interface 222B of FIG. 2 into the DMA receive buffer 310B, a receiver interrupt 320B can be triggered to the processor core 210B of FIG. 2. DMA controller 214A can continue with transferring the application message 316 to the communication interface 222A of FIG. 2 after synchronization message A-B 314 is transferred.

The DMA controller 214B can transfer a synchronization message B-A 315 from DMA transmit buffer 308B through the communication interface 222B of FIG. 2 to the DMA receive buffer 310A. Upon completing the transfer of synchronization message B-A 315, a transmitter interrupt 318B can be triggered to the processor core 210B of FIG. 2. Upon the DMA controller 214A completing transferring the synchronization message B-A 315 from the communication interface 222A of FIG. 2 into the DMA receive buffer 310A, a receiver interrupt 320A can be triggered to the processor core 210A of FIG. 2. Interrupt timer 312A can be used to track a time difference between transmitter interrupt 318A and receiver interrupt 320A. Similarly, interrupt timer 312B can be used to track a time difference between transmitter interrupt 318B and receiver interrupt 320B.

Figure 4:
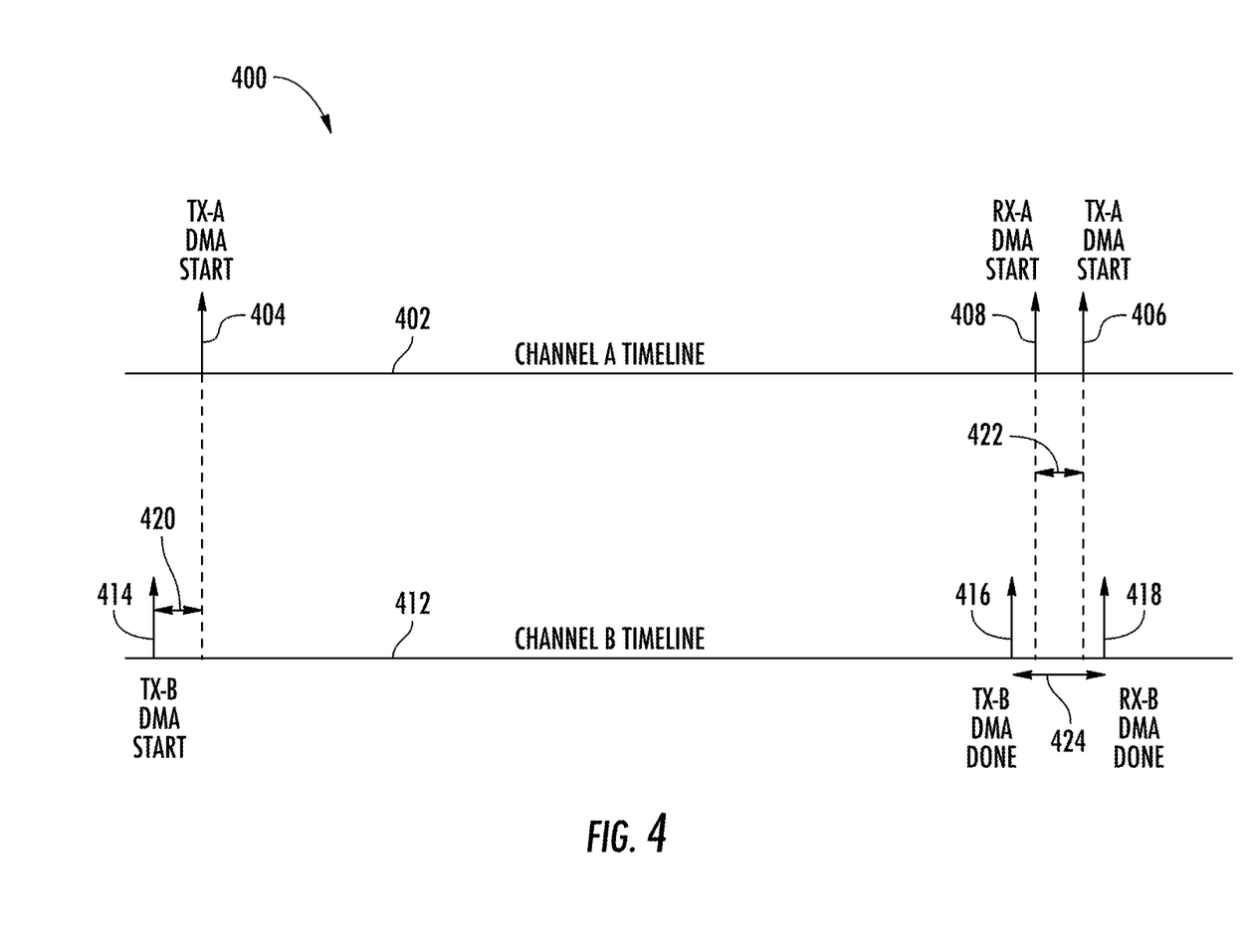
FIG. 4 depicts a timing diagram for synchronizing multiple control system channels, according to an embodiment of the present disclosure.

FIG. 4 depicts an example of a timing diagram 400 for synchronizing multiple control system channels. Channel A timeline 402 indicates example timing of the processing system 202A of FIG. 2 relative to channel B timeline 412 of the processing system 202B of FIG. 2, for instance, as configured in memory system configurations 302A, 302B of FIG. 3. In the example of FIG. 4, a transmit-A DMA start event 404 indicates a relative point in time where DMA controller 214A begins to transfer the synchronization message A-B 314 from the DMA transmit buffer 308A to the communication interface 222A for transmission to the communication interface 222B of FIG. 2. Transmit-A DMA done event 406 indicates a relative point in time where DMA controller 214A completes transferring the synchronization message A-B 314 from the DMA transmit buffer 308A to the communication interface 222A, resulting in transmitter interrupt 318A of FIG. 3.

Transmit-B DMA start event 414 indicates a relative point in time where DMA controller 214B of FIG. 2 begins to transfer the synchronization message B-A 315 of FIG. 3 from the DMA transmit buffer 308B to the communication interface 222B for transmission to the communication interface 222A of FIG. 2. Transmit-B DMA done event 416 indicates a relative point in time where DMA controller 214B completes transferring the synchronization message B-A 315 from the DMA transmit buffer 308B to the communication interface 222B, resulting in transmitter interrupt 318B of FIG. 3. Receive-A DMA done event 408 indicates when the DMA controller 214A completes receiving the synchronization message B-A 315 in DMA receive buffer 310A of FIG. 3, resulting in receiver interrupt 320A of FIG. 3 being triggered at the processor core 210A of FIG. 2. Similarly, receive-B DMA done event 418 indicates when the DMA controller 214B completes receiving the synchronization message A-B 314 in DMA receive buffer 310A of FIG. 3, resulting in receiver interrupt 320A of FIG. 3 being triggered at the processor core 210A of FIG. 2.

A synchronization timing skew 420 represents a time difference between the occurrence of the transmit-A DMA start event 404 and the transmit-B DMA start event 414. The value of the synchronization timing skew 420 may be unknown when the transmit-A DMA start event 404 and the transmit-B DMA start event 414 occur. The interrupt timer 312A can be used determine how much time elapses between the transmit-A DMA done event 406 and receive-A DMA done event 408 as characterized through detecting the transmitter interrupt 318A and the receiver interrupt 320A, which can occur in any order depending on whether the transmit-A DMA start event 404 leads or lags the transmit-B DMA start event 414. The relative order of the transmitter interrupt 318A and the receiver interrupt 320A and time difference 422 can indicate how far out of synchronization the processing system 202A is relative to the processing system 202B. Similarly, time difference 424 between the transmit-B DMA done event 416 and receive-B DMA done event 418 can indicate how far out of synchronization the processing system 202B is relative to the processing system 202A.

Corrective actions to shorten an execution frame time or extend an execution frame time can be performed by either or both of the processing systems 202A, 202B. For example, in an active/standby configuration, a control channel serving as a standby control can be adjusted to maintain synchronization with the active control channel. In an active/active configuration, where both processing systems 202A, 202B are actively performing control tasks, the timing adjustment may be split such that each control channel makes a timing adjustment such that the net effect resynchronizes the control channels within a synchronization tolerance.

Figure 5:
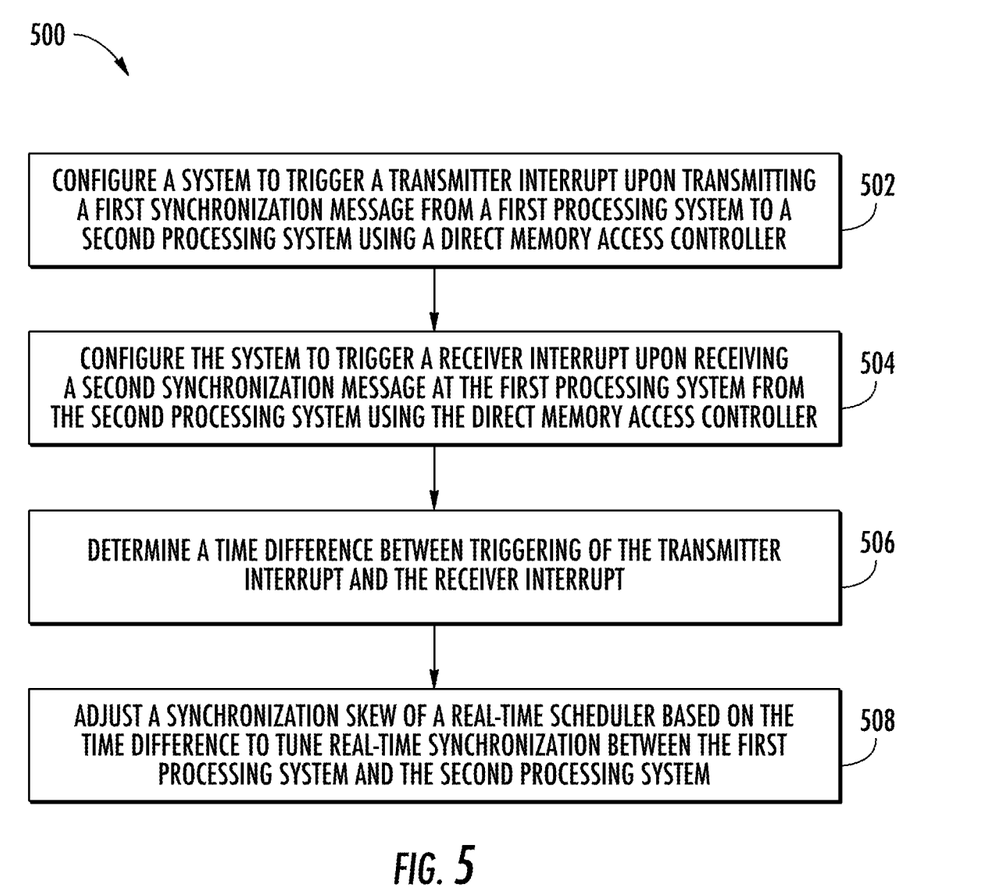
FIG. 5 is a flow diagram illustrating a process, according to an embodiment of the present disclosure.

Referring now to FIG. 5 with continued reference to FIGS. 1-5, FIG. 5 depicts a flow chart of a method 500 in accordance with an embodiment of the disclosure. The method 500 can be performed, for example, by the system 200 of FIG. 2.

At block 502, processor core 210A can configure DMA controller 214A to trigger a transmitter interrupt 318A upon transmitting a first synchronization message (e.g., synchronization message A-B 314) from the first processing system 202A to the second processing system 202B.

At block 504, the processor core 210A can configure the DMA controller 214A to trigger a receiver interrupt 320A upon receiving a second synchronization message (e.g., synchronization message B-A 315) at the first processing system 202A from the second processing system 202B.

At block 506, the processor 204A can determine a time difference between triggering of the transmitter interrupt 318A and the receiver interrupt 320A, for instance, using interrupt timer 312A.

At block 508, the processor 204A can adjust a synchronization skew of a real-time scheduler 304A based on the time difference to tune real-time synchronization between the first processing system 202A and the second processing system 202B. The adjustment can be performed with respect to clock 220A or other parameters of the processing system 202A. The method 500 can also be performed by processing system 202B or other processing systems that seek to be dynamically resynchronized.

In some embodiments, the DMA controller 214A can transfer the first synchronization message from a transmit buffer (e.g., DMA transmit buffer 308A) of the memory system 205A to the communication interface 222A absent intervention by the processor core 210A of the first processing system 202A after the processor core 210A configures and enables the DMA controller 214A. The processor core 210A can perform one or more other tasks while the DMA controller 214A transfers the first synchronization message from the DMA transmit buffer 308A of the memory system 205A to the communication interface 222A. The DMA controller 214A can also be configured to transfer the second synchronization message from the communication interface 222A to a receive buffer (e.g., DMA receive buffer 310A) of the memory system 205A absent intervention by the processor core 210A after the processor core 210A configures and enables the DMA controller 214A. The processor core 210A is operable to perform one or more other tasks while the DMA controller 214A transfers the second synchronization message from the communication interface 222A to the receive buffer of the memory system 205A.

In some embodiments, the processor core 210A can be configured to shorten an execution frame time based on determining that the time difference exceeds a synchronization threshold, and the transmitter interrupt 318A occurred after the receiver interrupt 320A. For instance, a next 100 millisecond execution frame could be reduced to 99.99 milliseconds to shorten the execution frame by 10 microseconds. The processor core 210A can be configured to extend an execution frame time based on determining the time difference exceeds a synchronization threshold, and the receiver interrupt 320A occurred after the transmitter interrupt 318A. For instance, a next 100 millisecond execution frame could be extended to 100.01 milliseconds to extend the execution frame by 10 microseconds. The processor core 210B can be similarly configured with respect to the transmitter interrupt 318B and the receiver interrupt 320B. The examples indicating specific time values are provided for purpose of explanation and are not to be construed as limiting to a specific time interval.

While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a memory system; and
   a processor of a first processing system comprising a processor core, a direct memory access controller, and a communication interface, the processor core configured to execute a plurality of instructions to:
   configure the direct memory access controller to trigger a transmitter interrupt upon transmitting a first synchronization message through the communication interface to a second processing system;
   configure the direct memory access controller to trigger a receiver interrupt upon receiving a second synchronization message from the second processing system;
   determine a time difference between triggering of the transmitter interrupt and the receiver interrupt; and
   adjust a synchronization skew of a real-time scheduler based on the time difference to tune real-time synchronization between the first processing system and the second processing system.

2. The system of claim 1, wherein the direct memory access controller is configured to transfer the first synchronization message from a transmit buffer of the memory system to the communication interface absent intervention by the processor core.

3. The system of claim 2, wherein the processor core is operable to perform one or more other tasks while the direct memory access controller transfers the first synchronization message from the transmit buffer of the memory system to the communication interface.

4. The system of claim 1, wherein the direct memory access controller is configured to transfer the second synchronization message from the communication interface to a receive buffer of the memory system absent intervention by the processor core.

5. The system of claim 4, wherein the processor core is operable to perform one or more other tasks while the direct memory access controller transfers the second synchronization message from the communication interface to the receive buffer of the memory system.

6. The system of claim 1, wherein the processor core is configured to shorten an execution frame time based on determining that the time difference exceeds a synchronization threshold, and the transmitter interrupt occurred after the receiver interrupt.

7. The system of claim 1, wherein the processor core is configured to extend an execution frame time based on determining the time difference exceeds a synchronization threshold, and the receiver interrupt occurred after the transmitter interrupt.

8. The system of claim 1, wherein the communication interface comprises a Universal Asynchronous Receiver/Transmitter.

9. The system of claim 1, wherein the first processing system and the second processing system comprise a real-time controller of a control system.

10. The system of claim 9, wherein the control system is a controller of an elevator system.

11. A method comprising:
configuring a direct memory access controller to trigger a transmitter interrupt upon transmitting a first synchronization message from a first processing system through a communication interface to a second processing system;
configuring the direct memory access controller to trigger a receiver interrupt upon receiving a second synchronization message at the first processing system from the second processing system;
determining a time difference between triggering of the transmitter interrupt and the receiver interrupt; and
adjusting a synchronization skew of a real-time scheduler based on the time difference to tune real-time synchronization between the first processing system and the second processing system.

12. The method of claim 11, further comprising:
transferring, by the direct memory access controller, the first synchronization message from a transmit buffer of the memory system to the communication interface absent intervention by a processor core of the first processing system.

13. The method of claim 12, further comprising:
performing one or more other tasks, by the processor core, while the direct memory access controller transfers the first synchronization message from the transmit buffer of the memory system to the communication interface.

14. The method of claim 11, further comprising:
transferring, by the direct memory access controller, the second synchronization message from the communication interface to a receive buffer of the memory system absent intervention by the processor core.

15. The method of claim 14, further comprising:
performing one or more other tasks, by the processor core, while the direct memory access controller transfers the second synchronization message from the communication interface to the receive buffer of the memory system.

16. The method of claim 11, further comprising:
shortening an execution frame time based on determining that the time difference exceeds a synchronization threshold, and the transmitter interrupt occurred after the receiver interrupt.

17. The method of claim 11, further comprising:
extending an execution frame time based on determining that the time difference exceeds a synchronization threshold, and the receiver interrupt occurred after the transmitter interrupt.

18. The method of claim 11, wherein the communication interface comprises a Universal Asynchronous Receiver/Transmitter.

19. The method of claim 11, wherein the first processing system and the second processing system comprise a real-time controller of a control system.

20. The method of claim 19, wherein the control system is a controller of an elevator system.

* * * * *